(12) United States Patent
Kang et al.

(10) Patent No.: US 11,909,030 B2
(45) Date of Patent: Feb. 20, 2024

(54) LITHIUM SECONDARY BATTERY

(71) Applicant: SK INNOVATION CO., LTD., Seoul (KR)

(72) Inventors: Min Gu Kang, Daejeon (KR); Soo Ho Kim, Daejeon (KR); Young Hoon Do, Daejeon (KR); Yong Hyun Cho, Daejeon (KR)

(73) Assignee: SK ON CO., LTD., Seoul (KR)

( * ) Notice: Subject to any disclaimer, the term of this patent is extended or adjusted under 35 U.S.C. 154(b) by 47 days.

(21) Appl. No.: 17/540,052

(22) Filed: Dec. 1, 2021

(65) Prior Publication Data
US 2022/0093905 A1  Mar. 24, 2022

Related U.S. Application Data

(63) Continuation of application No. 16/505,087, filed on Jul. 8, 2019, now Pat. No. 11,228,023.

(30) Foreign Application Priority Data

Jul. 6, 2018  (KR) .................. 10-2018-0078843
Jul. 6, 2018  (KR) .................. 10-2018-0078844

(51) Int. Cl.
*H01M 4/131*  (2010.01)
*H01M 4/36*  (2006.01)
(Continued)

(52) U.S. Cl.
CPC ........... *H01M 4/131* (2013.01); *H01M 4/366* (2013.01); *H01M 4/485* (2013.01); *H01M 4/505* (2013.01);
(Continued)

(58) Field of Classification Search
CPC ...... H01M 4/131; H01M 4/366; H01M 4/485; H01M 4/505; H01M 4/525; H01M 4/621;
(Continued)

(56) References Cited

U.S. PATENT DOCUMENTS

2015/0188183 A1  7/2015  Nagai et al.
2016/0049647 A1*  2/2016  Park ...................... H01M 4/131
                                              429/209
(Continued)

FOREIGN PATENT DOCUMENTS

CN   102522562 A   6/2012
CN   106663790 A   5/2017
(Continued)

OTHER PUBLICATIONS

Office Action for Chinese Patent Application No. 201910602973.5 issued by the Chinese Patent Office dated Jul. 8, 2022.
(Continued)

*Primary Examiner* — Daniel S Gatewood
(74) *Attorney, Agent, or Firm* — IP & T GROUP LLP

(57) ABSTRACT

A lithium secondary battery includes a cathode formed from a cathode active material including a first cathode active material particle and a second cathode active material particle, an anode and a separation layer interposed between the cathode and the anode. The first cathode active material particle includes a lithium metal oxide in which at least one metal forms a concentration gradient. The second cathode active material particle includes primary particles having different shapes or crystalline structures from each other.

13 Claims, 6 Drawing Sheets

(51) Int. Cl.
　　　*H01M 4/485*　　(2010.01)
　　　*H01M 4/505*　　(2010.01)
　　　*H01M 4/525*　　(2010.01)
　　　*H01M 4/62*　　(2006.01)
　　　*H01M 4/66*　　(2006.01)
　　　*H01M 10/0525*　　(2010.01)
　　　*H01M 10/42*　　(2006.01)
　　　*H01M 4/02*　　(2006.01)
　　　*H01M 50/489*　　(2021.01)

(52) U.S. Cl.
　　　CPC ........... *H01M 4/525* (2013.01); *H01M 4/621* (2013.01); *H01M 4/66* (2013.01); *H01M 10/0525* (2013.01); *H01M 10/4235* (2013.01); *H01M 50/489* (2021.01); *H01M 2004/021* (2013.01)

(58) Field of Classification Search
　　　CPC ............... H01M 4/66; H01M 10/0525; H01M 10/4235; H01M 50/489; H01M 2004/021; H01M 10/052; H01M 4/364; H01M 4/362; H01M 2220/20; H01M 2220/30; Y02E 60/10
　　　See application file for complete search history.

(56) References Cited

U.S. PATENT DOCUMENTS

2017/0338488 A1　　11/2017　　Sun et al.
2018/0145323 A1*　　5/2018　　Yoo ...................... H01M 4/525

FOREIGN PATENT DOCUMENTS

| CN | 107534140 | A | 1/2018 | |
| CN | 107949938 | A | 4/2018 | |
| CN | 108075178 | A | 5/2018 | |
| EP | 3121874 | A1 | 1/2017 | |
| EP | 3324465 | A1 * | 5/2018 | ............ C01G 53/50 |
| KR | 10-2013-0099341 | A | 9/2013 | |
| KR | 10-2014-0085347 | A | 7/2014 | |
| KR | 10-2015-0024371 | A | 3/2015 | |
| KR | 10-2015-0080390 | A | 7/2015 | |
| KR | 10-2018-0056261 | A | 5/2018 | |
| WO | 2016/204563 | A1 | 12/2016 | |
| WO | 2017/095139 | A1 | 6/2017 | |

OTHER PUBLICATIONS

Office Action for Korean Patent Application No. 10-2018-0078843 issued by the Korean Intellectual Property Office dated Aug. 17, 2022.
Office Action for the Chinese Patent Application No. 201910602973.5 issued by the Chinese Patent Office dated Feb. 16, 2023.
Notice of Allowance for the Chinese Patent Application No. 201910602973.5 issued by the Chinese Patent Office dated May 29, 2023.

* cited by examiner

LITHIUM SECONDARY BATTERY

CROSS-REFERENCE TO RELATED APPLICATION AND CLAIM OF PRIORITY

This application is a continuation of U.S. patent application Ser. No. 16/505,087 filed on Jul. 8, 2019, which claims priority to Korean Patent Application No. 10-2018-0078843 and 10-2018-0078844 filed on Jul. 6, 2018 in the Korean Intellectual Property Office (KIPO), the entire disclosure of which is incorporated by reference herein.

BACKGROUND

1. Field

The present invention relates to a lithium secondary battery. More particularly, the present invention relates to a lithium secondary battery including a lithium metal oxide.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

A lithium metal oxide may be used as a cathode active material of the lithium secondary battery preferably having high capacity, power and life-span. Further, a stability of the lithium secondary battery or the cathode active material under a harsh condition at a high temperature or a low temperature is also required as an industrial application of the lithium secondary battery is expanded. Additionally, when the lithium secondary battery or the cathode active material is penetrated by an external object, a resistance with respect to failures such as a short-circuit, an ignition or an explosion may be also needed.

However, the cathode active material having all of the above-mentioned properties may not be easily achieved. For example, Korean Publication of Patent Application No. 10-2017-0093085 discloses a cathode active material including a transition metal compound and an ion adsorbing binder, which may not provide sufficient life-span and stability.

SUMMARY

According to an aspect of the present invention, there is provided a lithium secondary battery having improved electrical and mechanical reliability and safety.

According to example embodiments, a lithium secondary battery includes a cathode formed from a cathode active material including a first cathode active material particle and a second cathode active material particle, an anode, and a separation layer interposed between the cathode and the anode. The first cathode active material particle includes a lithium metal oxide in which at least one metal forms a concentration gradient. The second cathode active material particle includes primary particles having different shapes or crystalline structures from each other.

In some embodiments, the second cathode active material particle may include a first particle arranged in a central region and a second particle arranged in a peripheral region, and the first particle and the second particle have different shapes or crystalline structures from each other.

In some embodiments, the first particle may have a granular structure or a spherical structure, and the second particle may have a rod shape or a needle shape.

In some embodiments, the central region of the second cathode active material particle may include an area within a region corresponding to 20% to 80% of a radius from a center of the second cathode active material particle.

In some embodiments, the first cathode active material particle may include a core portion, a shell portion, and a concentration gradient region between the core portion and the shell portion, and the concentration gradient may be formed in the concentration gradient region.

In some embodiments, the core portion and the shell portion each may include a fixed composition.

In some embodiments, the first cathode active material particle may include a continuous concentration gradient formed from a center of the first cathode active material particle to a surface of the first cathode active material particle.

In some embodiments, the first cathode active material particle may be represented by the following Chemical Formula 1.

$$\text{Li}_x\text{M1}_a\text{M2}_b\text{M3}_c\text{O}_y \qquad \text{[Chemical Formula 1]}$$

In Chemical Formula 1, M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, $0 < x \le 1.1$, $1.98 \le y \le 2.02$, $0 < a < 1$, $0 < b < 1$, $0 < c < 1$, and $0 < a+b+c < 1$.

In some embodiments, $0.6 \le a \le 0.95$ and $0.05 \le b+c \le 0.4$ in the Chemical Formula 1.

In some embodiments, $0.7 \le a \le 0.9$ and $0.1 \le b+c \le 0.3$ in the Chemical Formula 1.

In some embodiments, M1 may be nickel (Ni), M2 may be manganese (Mn), and M3 may be cobalt (Co).

In some embodiments, the second cathode active material particle may be represented by the following Chemical Formula 2.

$$\text{Li}_x\text{Ni}_a\text{Co}_b\text{Mn}_c\text{M4}_d\text{M5}_e\text{O}_y \qquad \text{[Chemical Formula 2]}$$

In Chemical Formula 2, M4 may include at least one element selected from a group consisting of Ti, Zr, Al, Mg, and Cr; and M5 may include at least one element selected from a group consisting of Sr, Y, W, and Mo; $0 < x < 1.5$, $1.98 \le y \le 2.02$, $0.313 \le a \le 0.353$, $0.313 \le b \le 0.353$, $0.313 \le c \le 0.353$, $0 \le d \le 0.03$, $0 \le e \le 0.03$, and $0.98 \le a+b+c \le 1.02$.

In some embodiments, the second cathode active material particle may include a lithium metal oxide having an excessive amount of lithium, and at least two metal elements except for lithium.

In some embodiments, the second cathode active material particle may be represented by the following Chemical Formula 3.

$$\text{Li}_x\text{Ni}_\alpha\text{Co}_\beta\text{Mn}_\gamma\text{M4}_\delta\text{M5}_\varepsilon\text{O}_y \qquad \text{[Chemical Formula 3]}$$

In Chemical Formula 3, M4 may include at least one element selected from a group consisting of Ti, Zr, Al, Mg, and Cr; and M5 may include at least one element selected from a group consisting of Sr, Y, W, and Mo; $0<x<1.1$, $1.98 \leq y \leq 2.02$, $0.48 \leq \alpha \leq 0.52$ $0.18 \leq \beta \leq 0.27$, $0.24 \leq \gamma \leq 0.32$, $0 \leq \delta \leq 0.03$, $0 \leq \varepsilon \leq 0.03$, and $0.98 \leq \alpha + \beta + \gamma \leq 1.02$.

In some embodiments, $0.49 \leq a \leq 0.51$ $0.18 \leq \beta \leq 0.22$, and $0.28 \leq \gamma \leq 0.32$ in the Chemical Formula 3.

In some embodiments, a blending weight ratio of the first cathode active material particle and the second cathode active material particle may be in a range from 9:1 to 1:9.

In some embodiments, an exothermic peak of the second cathode active material particle is 40 J/g or less at 200° C. or more in a Differential Scanning Calorimetry (DSC) measurement.

According to example embodiments as described above, a cathode active material of a lithium secondary battery may include a first cathode active material particle having a concentration gradient and a second cathode active material particle having a multi-shaped structure. High capacity and high power output characteristics of the lithium secondary battery can be achieved through the first cathode active material particle. High output, penetration safety, and thermal stability of the lithium secondary battery can be achieved through the second cathode active material particle. Additionally, penetration stability at a high state of charge (SoC) can be improved.

Therefore, both electrical performance and mechanical safety of the lithium secondary battery can be improved.

DETAILED DESCRIPTION OF THE EMBODIMENTS

According to example embodiments of the present invention, a lithium secondary battery including a first cathode active material particle having a concentration gradient and a second cathode active material particle having a multi-shaped structure as a cathode active material and having improved electrical performance and mechanical safety is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "a first" and "a second" used herein are not intended to specify the number or the order of objects, and only used to identify different elements or objects.

Figure 1:
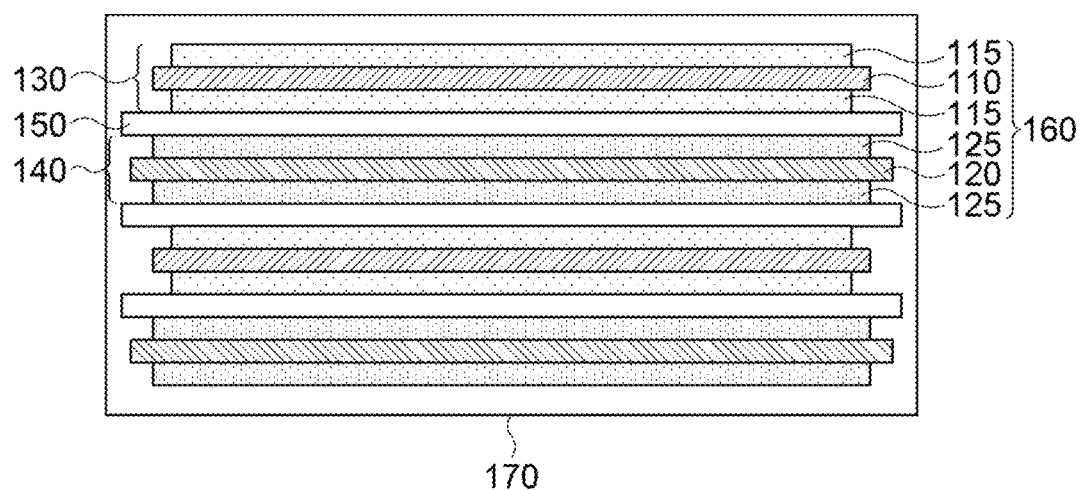
FIG. 1 is a schematic cross-sectional view illustrating a lithium secondary battery in accordance with example embodiments.

FIG. 1 is a schematic cross-sectional view illustrating a lithium secondary battery in accordance with example embodiments.

Referring to FIG. 1, a lithium secondary battery may include a cathode 130, and anode 140 and a separation layer 150 interposed between the cathode 130 and the anode 140.

The cathode 130 may include a cathode current collector 110 and a cathode active material layer 115 formed by coating a cathode active material on the cathode current collector 110.

In exemplary embodiments, the cathode active material may include a first cathode active material particle and a second cathode active material particle, and may be formed by mixing the first cathode active material particle and the second cathode active material particle.

The first cathode active material particle may have a concentration gradient. For example, the first cathode active material particle may include a lithium metal oxide in which at least one of metal elements forms the concentration gradient. The lithium metal oxide may include nickel and other transition metal, and nickel may be included as an excessive amount among the metal elements except lithium. The term "excessive amount" as used herein refers to the largest content or molar ratio among the metal elements except lithium.

In exemplary embodiments, the first cathode active material particle may include a concentration gradient region between a central portion and a surface. For example, the concentration gradient region may be formed in a specific region between the central portion and the surface.

In exemplary embodiments, the first cathode active material particle may include a core portion and a shell portion, and the concentration gradient region may be included between the core portion and the shell portion. For example, the core portion may include the central portion, and the shell portion may include the surface.

A concentration gradient about some metal elements of the lithium metal oxide may be formed in the concentration gradient region. In the core portion and the shell portion, the concentration can be uniform or fixed. For example, the lithium metal oxide of the core portion and the shell portion may have a substantially fixed composition.

In some embodiments, the concentration gradient region may be formed at the central portion. In some embodiments, the concentration gradient region may be formed at the surface.

In some embodiments, each concentration of lithium and oxygen may be substantially fixed throughout an entire region of the particle, and at least one element except for lithium and oxygen may have the continuous concentration gradient.

The term "continuous concentration gradient" used herein may indicate a concentration profile which may be changed with a uniform trend or tendency between the central portion and the surface portion. The uniform trend may include an increasing trend or a decreasing trend.

In some embodiments, the first cathode active material particle may include a lithium metal oxide having a continuous concentration gradient from a central portion of the particle to a surface of the particle. For example, the concentration gradient region may be formed over an entire diameter or radius from a center to a surface of the first cathode active material particle. In some embodiments, the first cathode active material particle may have a full concentration gradient (FCG) structure in which the concentration gradient may be substantially formed throughout the entire particle.

The term "central portion" used herein may include a central point of the active material particle and may also include a region within a predetermined radius or diameter from the central point. For example, "central portion" may encompass a region within a radius of about 0.1 μm from the central point of the active material particle.

The term "surface portion" used herein may include an outermost surface of the active material particle, and may also include a predetermined thickness from the outermost surface. For example, "surface portion" may include a region within a thickness of about 0.1 μm from the outermost surface of the active material particle.

In some embodiments, the continuous concentration particle may include a linear concentration profile or a curved concentration profile. In the curved concentration profile, the concentration may change in a uniform trend without any inflection point.

In an embodiment, at least one metal except for lithium included in the first cathode active material particle may have an increasing continuous concentration gradient, and at least one metal except for lithium included in the first cathode active material particle may have an decreasing continuous concentration gradient In an embodiment, at least one metal included in the first cathode active material particle except for lithium may have a substantially constant concentration from the central portion to the surface.

In an embodiment, metals included in the first cathode active material particle except for lithium may include a first metal M1 and a second metal M2. The first metal M1 may have a continuously decreasing concentration gradient from the central portion to the surface. The second metal M2 have a continuously increasing concentration gradient from the central portion to the surface.

In an embodiment, the metals included in the first cathode active material particle except for lithium may further include a third metal M3. The third metal M3 may have a substantially constant concentration from the central portion to the surface.

The term "concentration" used herein may indicate, e.g., a molar ratio of the first to third metals.

For example, the first cathode active material particle may be represented by the following Chemical Formula 1.

$$Li_xM1_aM2_bM3_cO_y \qquad \text{[Chemical Formula 1]}$$

In the Chemical Formula 1 above, M1, M2 and M3 may be selected from Ni, Co, Mn, Na, Mg, Ca, Ti, V, Cr, Cu, Zn, Ge, Sr, Ag, Ba, Zr, Nb, Mo, Al, Ga and B, and $0<x\leq1.1$, $1.98\leq y\leq2.02$, $0<a<1$, $0<b<1$, $0<c<1$, and $0<a+b+c\leq1$.

In some embodiments, M1, M2 and M3 of Chemical Formula 1 may be nickel (Ni), manganese (Mn) and cobalt (Co), respectively.

For example, nickel may serve as a metal related to a capacity of the lithium secondary battery. As an amount of nickel becomes higher, capacity and power of the lithium secondary battery may be improved. However, an excessive amount of nickel may degrade of a life-span property of the battery, and may be disadvantageous in an aspect of mechanical and electrical stability of the battery. For example, when the amount of nickel is excessively increased, defects such as ignition or short-circuit by a penetration of an external object may not be sufficiently suppressed.

However, according to example embodiments, nickel may be included as the first metal M1. Thus, the amount of nickel at the central portion may be relatively high to improve the capacity and power of the lithium secondary battery, and a concentration of nickel may be decreased from the central portion to the surface to prevent the defects from the penetration and a life-span reduction.

For example, manganese (Mn) may serve as a metal related to the mechanical and electrical stability of the lithium secondary battery. In example embodiments, an amount of Mn may be increased from the central portion to the surface so that the defects from the penetration such as ignition or short-circuit through the surface may be suppressed or reduced, and the life-span of the lithium secondary battery may be also enhanced.

For example, cobalt (Co) may serve as a metal related to a conductivity or a resistance of the lithium secondary battery. In example embodiments, a concentration of cobalt may be fixed or uniformly maintained through an entire region of the first cathode active material particle. Thus, a current or a charge flow through the first cathode active material particle may be uniformly maintained while improving the conductivity of the battery and maintaining low resistance.

In some embodiments, in Chemical Formula 1, the first metal M1 may be nickel, and, e.g., $0.6\leq a\leq 0.95$ and $0.05\leq b+c\leq 0.4$. For example, a concentration (or a molar ratio) of nickel may be continuously decreased from about 0.95 to about 0.6.

If a lower limit of the nickel concentration (e.g., a surface concentration) is less than about 0.6, capacity and power at the surface of the first cathode active material particle may be excessively deteriorated. If an upper limit of the nickel concentration (e.g., a central concentration) exceeds about 0.95, life-span and mechanical stability at the central portion may be excessively degraded.

Preferably, in Chemical Formula 1, $0.7\leq a\leq 0.9$ and $0.1\leq b+c\leq 0.3$. In this case, both capacity and stability of the battery may be enhanced.

In exemplary embodiments, the first cathode active material particle may include a concentration gradient region in which at least one metal forms a concentration gradient between the central portion and the surface. For example, the concentration gradient may include a specific region between the central portion and the surface. The first cathode active material particle may have a fixed concentration profile in a region except the concentration gradient region.

In some embodiments, the first metal (M1), the second metal (M2), and the third metal (M3) may have the concentration profile described above in the concentration gradient region. In some embodiments, the concentration gradient region may be formed at the central portion. In some embodiments, the concentration gradient region may be formed at the surface.

In some embodiments, the first cathode active material particle may further include a coating layer on the surface thereof. For example, the coating layer may include Al, Ti, Ba, Zr, Si, B, Mg, P, an alloy thereof or an oxide thereof. These may be used alone or in a mixture thereof. The first cathode active material particle may be protected by the coating layer so that penetration stability and life-span of the battery may be further improved.

In some embodiments, the elements, the alloy or the oxide of the coating layer may be inserted in the first cathode active material particle as a dopant.

In some embodiments, the first cathode active material particle may be formed from a primary particle having a rod-type shape. An average diameter of the first cathode active material particle may be in a range from about 3 μm to about 25 μm.

For example, characteristics of high capacity and/or high output can be realized by using the first cathode active material particle having a lithium metal oxide in which nickel is excessively used. Additionally, a concentration gradient can be included in the first cathode active material, to suppress deterioration of life-span and operational stability caused by use of excessive nickel.

According to exemplary embodiments, as the second cathode active material particle having a multi-shaped structure may be blended with the first cathode active material particle, penetration safety or resistance characteristic of the lithium secondary battery can be remarkably improved.

For example, if the cathode active material containing nickel in an excessive amount may be used alone, when the secondary battery is penetrated by an external object a large amount of heat energy is generated in a short time due to an overcurrent, so that ignition or explosion may occur.

According to exemplary embodiments, the second cathode active material having a multi-shaped structure may be blended with the first cathode active material. In this case, even if the secondary battery is penetrated heat generation due to an overcurrent is suppressed, to prevent ignition or explosion.

For example, as the second cathode active material particle may include primary particles having different particle shapes, an interior structure of the cathode active material particle can be irregular. The particles having different shapes may act as a resistor between each other, so that immoderate heat progression can be suppressed.

According to exemplary embodiments, the second cathode active material particle may have a multi-shaped structure. The term "multi-shaped" used herein is distinguished from "single-shaped" and may refer to a cohesive structure of particles of different shapes.

For example, the second cathode active material particle may have a secondary particle structure formed by agglomerating primary particles. The second cathode active material particle may include a plurality of primary particles having different shapes or crystalline structures from each other.

In some embodiments, the second cathode active material particle (e.g., primary particles included in the second cathode active material particle) may include a first particle and a second particle having different shapes or crystalline structures from each other.

For example, the first particle and the second particle may have various shapes such as granule, sphere, ellipse, rod, and needle, and may have different shapes or crystalline structures to each other.

The first particle may be arranged in a central region of the second cathode active material particle, and the second particle may be arranged in a peripheral region of the second cathode active material particle.

For example, the central region may encompass a region corresponding to a length of about 20% to about 80% from the center to a radius of the second cathode active material particle. The peripheral region may encompass a remaining area outside the central region. In some embodiments, the central region may encompass a region corresponding to a length of about 40% to about 70% from the center to a radius of the second cathode active material particle.

In some embodiments, the first particle arranged in the central region may have a granular structure or a spherical structure, and the second particle arranged in the peripheral region may have a rod shape structure or a needle shape structure. In this case, electrical conductivity and capacity characteristic can be achieved in the peripheral region through the second particle, and abrupt heat propagation in the central region can be effectively prevented through the first particle.

According to exemplary embodiments, the second cathode active material particle may include a lithium metal oxide. In exemplary embodiments, the second cathode active material particle may include a nickel-containing lithium metal oxide. A concentration of nickel in the second cathode active material particle may be smaller than a concentration of nickel in the first cathode active material particle. In some embodiments, the concentration of nickel in the second cathode active material particle may be fixed as smaller than a concentration of nickel in the surface of the first cathode active material particle.

In some embodiments, the second cathode active material particle may include at least two metal elements except lithium. For example, the concentration of the metals except lithium can be kept constantly from the central portion to the surface.

In some embodiments, the second cathode active material particle may include a first metal M1', a second metal M2', and a third metal M3'. For example, the first metal M1', the second metal M2' and the third metal M3' may be nickel, cobalt and manganese, respectively.

In some embodiments, a concentration or a molar ratio of nickel, cobalt and manganese can be maintained uniform over an entire region of the second cathode active material particle.

In exemplary embodiments, the second cathode active material particle may be represented by the following Chemical Formula 2.

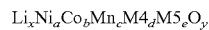   [Chemical Formula 2]

In Chemical Formula 2, M4 may include at least one element selected from a group consisting of Ti, Zr, Al, Mg, and Cr; and M5 may include at least one element selected from a group consisting of Sr, Y, W, and Mo; and 0<x<1.5, 1.98≤y≤2.02, 0.313≤a≤0.353, 0.313≤b≤0.353, 0.313≤c≤0.353, 0≤d≤0.03, 0≤e≤0.03, and 0.98 ≤a+b+c≤1.02.

By controlling content or molar ratio of nickel, cobalt and/or manganese of the second cathode active material substantially same, thermal and mechanical properties such as life stability and penetration safety can be improved through the second cathode active material.

According to some exemplary embodiments, when measuring the second cathode active material particle represented by Chemical Formula 2 with Differential Scanning Calorimetry (DSC), an exothermic peak of 40 J/g or less may be exhibited at a temperature of 200° C. or higher. According to some embodiments, the second cathode active material particle may exhibit an exothermic peak of 15 J/g or less at a temperature of 320° C. or higher in DSC method.

In some embodiments, the second cathode active material particles may include nickel as the excessive amount in consideration of capacity and stability of the lithium secondary battery, and a concentration may be controlled in the order of nickel, manganese, and cobalt. According to exemplary embodiments, the concentration ratio of nickel:cobalt:manganese in the second cathode active material particle may be substantially about 5:2:3.

In exemplary embodiments, the second cathode active material particle may be represented by the following Chemical Formula 3 as a lithium nickel-cobalt-manganese oxide.

   [Chemical Formula 3]

In Chemical Formula 3, M4 may include at least one element selected from a group consisting of Ti, Zr, Al, Mg, and Cr; and M5 may include at least one element selected from a group consisting of Sr, Y, W, and Mo; and $0<x<1.1$, $1.98 \leq y \leq 2.02$, $0.48 \leq \alpha \leq 0.52$ $0.18 \leq \beta \leq 0.27$, $0.24 \leq \gamma \leq 0.32$, $0 \leq \delta \leq 0.03$, $0 \leq \varepsilon \leq 0.03$, and $0.98 \leq \alpha + \beta + \gamma \leq 1.02$.

In some embodiments, $0.49 \leq \alpha \leq 0.51$ $0.18 \leq \rho < 0.22$, and $0.28 \leq \gamma \leq 0.32$ in the Chemical Formula 3.

For example, the second cathode active material particle may have a nickel concentration or a nickel molar ratio less than that of the first cathode active material particle through an entire region of the particle, and Mn may be distributed uniformly throughout the second cathode active material particle. By controlling content or molar ratio of nickel, cobalt and/or manganese of the second cathode active material to 5:2:3, respectively, thermal and mechanical properties such as life stability and penetration safety can be improved through the second cathode active material.

According to some exemplary embodiments, when measuring the second cathode active material particle represented by Chemical Formula 3 with Differential Scanning Calorimetry (DSC), an exothermic peak of 25 J/g or less may be exhibited at a temperature of 200° C. or higher. According to some embodiments, the second cathode active material particle may exhibit an exothermic peak of 25 J/g or less at a temperature of 320° C. or higher in DSC method.

In some embodiments, the second cathode active material particle may further include a coating layer on the surface thereof. For example, the coating layer may include Al, Ti, Ba, Zr, Si, B, Mg, P, an alloy thereof, an oxide thereof, an phosphate thereof or an fluoride thereof. The first cathode active material particle may be protected by the coating layer so that penetration stability and life-span of the battery may be further improved. By further including the coating layer, characteristics of capacity and power output of the cathode active material can be improved.

In some embodiments, the elements, the alloy or the oxide of the coating layer may be inserted in the second cathode active material particle as a dopant.

In some embodiments, the cathode active material may be prepared by fabricating each of the first cathode active material particle and the second cathode active material particle, and then blending the first cathode active material particle and the second cathode active material particle.

In example embodiments, a mixing ratio of the first cathode active material particle and the second cathode active material particle may be, e.g., in a range from 9:1 to 1:9, preferably, from 6:4 to 1:9. Within the above range, a thermal stability improvement and a prevention of a penetration-induced ignition by the second cathode active material particle may be more effectively achieved, and a high density characteristic of the secondary battery can be achieved.

Preferably, if using the second cathode active material particles represented by Formula 2, the mixing weight ratio may be 6:4 to 9:1. In the case of using the second cathode active material particles represented by Formula 3, the mixing weight ratio may be from 6:4 to 3:7.

In a formation of the first cathode active material particle, metal precursor solutions having different concentrations may be prepared. The metal precursor solutions may include precursors of metals that may be included in the cathode active material. For example, the metal precursors may include halides, hydroxides, acid salts, etc., of the metals.

For example, the metal precursors may include a lithium precursor (e.g., a lithium oxide), a nickel precursor, a manganese precursor and a cobalt precursor.

In some embodiments, a first precursor solution having a target composition at the central portion (e.g., concentrations of nickel, manganese and cobalt at the central portion) and a second precursor solution having a target composition at the surface or the surface portion (e.g., concentrations of nickel, manganese and cobalt at the surface) may be each prepared.

Subsequently, the first and second precursor solution may be mixed and a precipitate may be formed by a co-precipitation method. In some embodiments, a mixing ratio may be continuously changed so that a continuous concentration gradient may be formed from the target composition at the central portion to the target composition at the surface. Accordingly, the precipitate may include a concentration gradient of the metals therein.

In some embodiments, a chelate agent and a basic agent (e.g., an alkaline agent) may be added while forming the precipitate. In some embodiments, the precipitate may be thermally treated, and then a lithium salt may be mixed and thermally treated again.

The second cathode active material particle may be formed by precipitating a single metal precursor solution having a target composition while stirring. During the precipitation, a multi-shaped structure having particles of a plurality of shapes or crystalline structures can be produced by changing a flow rate, composition, concentration, temperature, stirring speed, etc. of the precursor solution.

In exemplary embodiments, the cathode active material may be mixed and stirred together with a binder, a conductive additive and/or a dispersive additive in a solvent to form a slurry. The slurry may be coated on the cathode current collector 110, and pressed and dried to obtain the cathode 130.

The cathode current collector 110 may include a metal which has a high conductivity and can be easily adhered an active material slurry and has no reactivity in a voltage range of the battery. The cathode current collector 110 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 115, and an amount of the first and second cathode active material particles may be relatively increased. Thus, capacity and power output of the lithium secondary battery may be further improved.

The conductive additive may be added to facilitate an electron mobility between the active material particles. For example, the conductive additive may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

In exemplary embodiments, the anode 140 may include an anode current collector 120 and an anode active material layer 125 formed by coating an anode active material on the anode current collector 120.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), ETC. The crystalline carbon may include a graphite-based material, such as natural graphite, graphitized cokes, graphitized MCMB, graphitized MPCF, etc. The lithium alloy may further include aluminum, zinc, bismuth, cadmium, antimony, silicon, lead, tin, gallium, or indium.

The anode current collector 110 may include a metal which has a high conductivity and can be easily adhered an active material slurry and has no reactivity in a voltage range of the battery. The anode current collector 120 may include gold, stainless-steel, nickel, aluminum, titanium, copper or an alloy thereof, preferably, may include copper or a copper alloy.

In some embodiments, the anode active material may be mixed and stirred together with a binder, a conductive additive and/or a dispersive additive in a solvent to form a slurry. The slurry may be coated on the anode current collector 120, and pressed and dried to obtain the anode 140.

The binder and the conductive additive substantially the same as or similar to those as mentioned above may be used. In some embodiments, the binder for the anode 140 may include an aqueous binder such as such as styrene-butadiene rubber (SBR) that may be used with a thickener such as carboxymethyl cellulose (CMC) so that compatibility with the carbon-based active material may be improved.

The separation layer 150 may be interposed between the cathode 130 and the anode 140. The separation layer 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 150 may be also formed from a non-woven fabric including a glass fiber with a high melting point, a polyethylene terephthalate fiber, or the like.

In some embodiments, an area and/or a volume of the anode 140 (e.g., a contact area with the separation layer 150) may be greater than that of the cathode 130. Thus, lithium ions generated from the cathode 130 may be easily transferred to the anode 140 without loss by, e.g., precipitation or sedimentation. Therefore, the enhancement of power and stability by the combination of the first and second cathode active material particles may be effectively implemented.

In example embodiments, an electrode cell 160 may be defined by the cathode 130, the anode 140 and the separator 150, and a plurality of the electrode cells 160 may be stacked to form an electrode assembly having, e.g., a jelly roll shape. For example, the electrode assembly may be formed by winding, laminating or folding of the separation layer 150.

The electrode assembly may be accommodated in an outer case 170 together with an electrolyte to form the lithium secondary battery. In example embodiments, the electrolyte may include a non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

An electrode tab may be formed from each of the cathode current collector 110 and the anode current collector 120 to extend to one end of the outer case 170. The electrode tabs may be welded together with the one end of the outer case 170 to form an electrode lead exposed at an outside of the outer case 170.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Examples: Fabrication of Secondary Battery (1) Cathode

'Cathode 1' was formed by forming a precipitate while continuously changing a mixing ratio of precursors.

The total composition of Cathode 1 was $LiNi_{0.8}Co_{0.11}Mn_{0.09}O_2$. The compositions of a core portion and a shell portion of Cathode 1 were $LiNi_{0.84}Co_{0.11}Mn_{0.05}O_2$ and $LiNi_{0.78}Co_{0.10}Mn_{0.12}O_2$, respectively.

The concentration gradient region was formed between the core portion and the shell portion. In the concentration gradient region, a Ni concentration decreased and a Mn concentration increased.

A precursor solution including a metal oxide precursor containing Ni, Co, and Mn in a molar ratio of about 1:1:1 and a chelating agent containing ammonia and NaOH was coprecipitated under the first condition of Table 1 below.

Sequentially, the precursor solution was further coprecipitated under the second condition to form 'The multi-shaped NCM111'.

The multi-shaped NCM111 had a composition of about $LiNi_{1/3}Co_{1/3}Mn_{1/3}O_2$. The multi-shaped NCM111 contained granular primary particles in the central region of a radius of about 60% from the center of the particle, and rod-shaped primary particles in the peripheral region.

A precursor solution including a metal oxide precursor containing Ni, Co, and Mn in a molar ratio of about 5:2:3 and a chelating agent containing ammonia and NaOH was coprecipitated under the third condition of Table 1 below.

Sequentially, the precursor solution was further coprecipitated under the forth condition to form 'The multi-shaped NCM523'.

The multi-shaped NCM523 had a composition of about $LiNi_{0.5}Co_{0.2}Mn_{0.3}O_2$. The multi-shaped NCM523 contained granular primary particles in the central region of a radius of about 45% from the center of the particle, and rod-shaped primary particles in the peripheral region.

TABLE 1

| | Feed rate (Hz) | Flow rate of metal oxide precursor (L/min) | Flow rate of chelating agent (L/min) | Stirring speed (rpm) | Temperature (° C.) | Reaction time (h) |
|---|---|---|---|---|---|---|
| First condition | 10 | 8 | 4 | 200 | 50 | 50 |
| Second condition | 5 | 4 | 2 | 300 | 50 | 30 |
| Third condition | 12 | 8 | 4 | 300 | 50 | 50 |
| Forth condition | 6 | 4 | 2 | 350 | 50 | 20 |

Denka Black was used as a conductive additive, and PVDF was used as a binder. The cathode active material in which the cathode active material particles were mixed in a weight ratio shown in Table 2 below, the conductive additive and the binder were mixed by a weight ratio of 92:5:3 to form a cathode slurry. The cathode slurry was coated, dried, and pressed on an aluminum substrate to form a cathode. A density of the cathode after the pressing was 3.5 g/cc or more.

(2) Anode

An anode slurry was prepared by mixing 93 wt % of a natural graphite as an anode active material, 5 wt % of a flake type conductive additive KS6, 1 wt % of SBR as a binder, and 1 wt % of CMC as a thickener. The anode slurry was coated, dried, and pressed on a copper substrate to form an anode.

(3) Lithium Secondary Battery

The cathode and the anode obtained as described above were notched with a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch (e.g., except for an electrolyte injection side) were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M LiPF6 in a mixed solvent of EC/EMC/DEC (25/45/30; volume ratio), and then 1 wt % of vinylene carbonate, 0.5 wt % of 1,3-propensultone (PRS), and 0.5 wt % of lithium bis (oxalato) borate (LiBOB) were added.

The lithium secondary battery as fabricated above was pre-charged by applying a pre-charging current (5 A) corresponding to 0.25 C for 36 minutes. After 1 hour, the battery was degased, aged for more than 24 hours, and then a formation charging-discharging (charging condition of CC-CV 0.2 C 4.2 V 0.05 C CUT-OFF, discharging condition CC 0.2 C 2.5 V CUT-OFF) was performed. Then, a standard charging-discharging (charging condition of CC-CV 0.5 C 4.2 V 0.05 C CUT-OFF, discharging condition CC 0.5 C 2.5 V CUT-OFF) was performed.

Comparative Examples

Instead of the multi-shaped NCM111 and the multi-shaped NCM523, a single-shaped NCM111 and a single-shaped NCM 523, a secondary battery was manufactured in the same manner as in the above example.

The single-shaped NCM111 had a composition of $LiNi_{1/3}Co_{1/3}Mn_{1/3}O_2$ and the same particle shapes in the central region and the peripheral region.

The single-shaped NCM523 had a composition of $LiNi_{0.5}Co_{0.2}Mn_{0.3}O_2$ and the same particle shapes in the central region and the peripheral region.

TABLE 2

| | First cathode active material particle | Second cathode active material particle | Blending weight ratio |
|---|---|---|---|
| Example 1 | Cathode 1 | Multi-shaped NCM111 | 80:20 |
| Example 2 | Cathode 1 | Multi-shaped NCM111 | 70:30 |
| Example 3 | Cathode 1 | Multi-shaped NCM111 | 60:40 |
| Example 4 | Cathode 1 | Multi-shaped NCM111 | 50:50 |
| Example 5 | Cathode 1 | Multi-shaped NCM111 | 40:60 |
| Example 6 | Cathode 1 | Multi-shaped NCM111 | 30:70 |
| Example 7 | Cathode 1 | Multi-shaped NCM111 | 20:80 |
| Example 8 | Cathode 1 | Multi-shaped NCM111 | 10:90 |
| Example 9 | Cathode 1 | Multi-shaped NCM523 | 90:10 |
| Example 10 | Cathode 1 | Multi-shaped NCM523 | 80:20 |
| Example 11 | Cathode 1 | Multi-shaped NCM523 | 70:30 |
| Example 12 | Cathode 1 | Multi-shaped NCM523 | 60:40 |
| Example 13 | Cathode 1 | Multi-shaped NCM523 | 50:50 |
| Comparative example 1 | Cathode 1 | Single-shaped NCM111 | 90:10 |
| Comparative example 2 | Cathode 1 | Single-shaped NCM111 | 80:20 |
| Comparative example 3 | Cathode 1 | Single-shaped NCM111 | 70:30 |
| Comparative example 4 | Cathode 1 | Single-shaped NCM111 | 60:40 |
| Comparative example 5 | Cathode 1 | Single-shaped NCM111 | 50:50 |
| Comparative example 6 | Cathode 1 | Single-shaped NCM111 | 40:60 |
| Comparative example 7 | Cathode 1 | Single-shaped NCM523 | 90:10 |
| Comparative example 8 | Cathode 1 | Single-shaped NCM523 | 80:20 |
| Comparative example 9 | Cathode 1 | Single-shaped NCM523 | 70:30 |
| Comparative example 10 | Cathode 1 | Single-shaped NCM523 | 60:40 |
| Comparative example 11 | Cathode 1 | Single-shaped NCM523 | 50:50 |

Experimental Example 1: Using the Multi-Shaped NCM111

(1) Evaluation on Life-Span Property at Room Temperature

The battery cells of Examples 1 to 8 and Comparative Examples were repeatedly charged (CC-CV 1.0 C 4.2 V 0.05 C CUT-OFF) and discharged (CC 1.0 C 2.75 V CUT-OFF) 500 times, and then a discharging capacity at a 500th cycle was calculated as a percentage (%) with respect to a first cycle discharging capacity to measure the life-span property at a room temperature. The result is shown in Table 3 below.

(2) Evaluation on Penetration Stability

The battery cells of Examples 1 to 8 and Comparative Examples were charged (1 C 4.2V 0.1 C CUT-OFF), and then the battery cells were penetrated by a nail having a diameter of 3 mm at a speed of 80 mm/sec and evaluated according to the following criteria. The results are shown in Table 3 below.

<EUCAR Hazard Level>

L1: No problem with battery performance
L2: Irreversible damage to battery performance
L3: The electrolyte of the battery is reduced by less than 50%.
L4: The electrolyte of the battery is reduced by 50% or more.
L5: Ignited or exploded

TABLE 3

|  | Life-span (%) (@500 cycle) | Penetration Stability |
|---|---|---|
| Example 1 | 93.2% | L3 |
| Example 2 | 94.1% | L3 |
| Example 3 | 96.2% | L3 |
| Example 4 | 96.9% | L3 |
| Example 5 | 98.0% | L3 |
| Example 6 | 98.5% | L3 |
| Example 7 | 99.3% | L3 |
| Example 8 | 99.9% | L3 |
| Comparative example 1 | 85.1% | L5 |
| Comparative example 2 | 86.4% | L5 |
| Comparative example 3 | 87.6% | L5 |
| Comparative example 4 | 89.3% | L4 |
| Comparative example 5 | 91.5% | L4 |
| Comparative example 6 | 92.9% | L4 |

As shown in Table 3, life-span and penetration stability were improved in Examples using the multi-shaped secondary cathode active material particles, as compared with Comparative Examples using the single-shaped secondary cathode active material particles.

Experimental Example 2: Change of the Central Region of the Multi-Shaped NCM111

The secondary batteries of Examples 13 to 19 were fabricated in the same manner as Example 3 except that the radius of the central region of the multi-shaped NCM111 was changed to the radius of the following Table 4 from the center of the particle.

The life and penetration characteristics of the secondary batteries of Examples 13 to 19 were evaluated by the above-described methods and are shown in Table 4 below.

TABLE 4

|  | Radius of central region of multi-shaped NCM111 | Life-span (%) | Penetration Stability |
|---|---|---|---|
| Example 3 | 60% | 96.2 | L3 |
| Example 14 | 10% | 96.0 | L4 |
| Example 15 | 20% | 95.5 | L3 |
| Example 16 | 40% | 98.1 | L3 |
| Example 17 | 70% | 97.5 | L3 |
| Example 18 | 80% | 95.2 | L3 |
| Example 19 | 90% | 94.5 | L4 |

As shown in Table 4, the penetration stability and the life-span were improved when the radius of the central region of the multi-shaped NCM111 was in range of 20% to 80%. The penetration stability and the life-span was further improved when the radius was in range of 40% to 80%.

Experimental Example 3: Using the Multi-Shaped NCM523

The secondary batteries of Examples 9 to 13 and Comparative Examples were charged once (CC-CV 1.0 C 4.2 V 0.05 C CUT-OFF) and discharged (CC 1.0 C 2.7 V CUT-OFF The capacity was measured and converted into energy density. After setting the cell capacity to 50 of SOC (State of Charge), the output characteristics were measured by HPPC (hybrid pulse power characterization) method.

The penetration stability was evaluated in the same manner as in Experimental Example 1. The results are shown in Table 5 below.

TABLE 5

|  | First cathode active material particle | Second cathode active material particle | Mixing ratio (in weight) | Energy density (Wh/L) | Power output (Wh/kg) | Penetration Stability |
|---|---|---|---|---|---|---|
| Example 9 | Cathode 1 | Multi-shaped NCM523 | 90:10 | 567 | 2391 | L4 |
| Example 10 | Cathode 1 | Multi-shaped NCM523 | 80:20 | 561 | 2474 | L3 |
| Example 11 | Cathode 1 | Multi-shaped NCM523 | 70:30 | 553 | 2536 | L3 |
| Example 12 | Cathode 1 | Multi-shaped NCM523 | 60:40 | 546 | 2585 | L3 |
| Example 13 | Cathode 1 | Multi-shaped NCM523 | 50:50 | 540 | 2716 | L3 |
| Comparative example 1 | Cathode 1 | Single-shaped NCM111 | 90:10 | 564 | 2169 | L4 |
| Comparative example 2 | Cathode 1 | Single-shaped NCM111 | 80:20 | 553 | 2238 | L3 |

TABLE 5-continued

| | First cathode active material particle | Second cathode active material particle | Mixing ratio (in weight) | Energy density (Wh/L) | Power output (Wh/kg) | Penetration Stability |
|---|---|---|---|---|---|---|
| Comparative example 3 | Cathode 1 | Single-shaped NCM111 | 70:30 | 543 | 2294 | L3 |
| Comparative example 4 | Cathode 1 | Single-shaped NCM111 | 60:40 | 532 | 2339 | L3 |
| Comparative example 5 | Cathode 1 | Single-shaped NCM111 | 50:50 | 522 | 2457 | L3 |
| Comparative example 7 | Cathode 1 | Single-shaped NCM523 | 90:10 | 567 | 2277 | L5 |
| Comparative example 8 | Cathode 1 | Single-shaped NCM523 | 80:20 | 561 | 2356 | L5 |
| Comparative example 9 | Cathode 1 | Single-shaped NCM523 | 70:30 | 553 | 2415 | L5 |
| Comparative example 10 | Cathode 1 | Single-shaped NCM523 | 60:40 | 546 | 2462 | L5 |
| Comparative example 11 | Cathode 1 | Single-shaped NCM523 | 50:50 | 540 | 2587 | L4 |

As shown in Table 5, energy density, power output and penetration characteristic were in Examples using the multi-shaped NCM523.

Experimental Example 4: Change of the Central Region of the Multi-Shaped NCM523

The secondary batteries of Examples 20 to 26 were fabricated in the same manner as Example 12 except that the radius of the central region of the multi-shaped NCM523 was changed to the radius of the following Table 6 from the center of the particle.

The life and penetration characteristics of the secondary batteries of Examples 20 to 26 were evaluated by the above-described methods and are shown in Table 6 below.

TABLE 6

| | Weight ratio of Cathode 1 and multi-shaped NCM523 | Radius of central region of multi-shaped NCM523 | Power output (Wh/kg) | Penetration Stability |
|---|---|---|---|---|
| Example 20 | 6:4 | 45% | 2585 | L3 |
| Example 21 | 6:4 | 10% | 2554 | L4 |
| Example 22 | 6:4 | 20% | 2489 | L3 |
| Example 23 | 6:4 | 40% | 2701 | L3 |
| Example 24 | 6:4 | 70% | 2635 | L3 |
| Example 25 | 6:4 | 80% | 2432 | L3 |
| Example 26 | 6:4 | 90% | 2405 | L4 |

As shown in Table 6, power output and penetration stability were improved when the radius of the central region of the multi-shaped NCM523 was in range of 20% to 80%. The penetration stability and the life-span were further improved when the radius was in range of 40% to 70%.

Experimental Example 5: Evaluation of Penetration Safety According to SOC (1) Examples 27 to 30

The state of charge of the secondary battery of Example 10 gradually reduced by 10% to prepare secondary batteries of Examples 27 to 30.

The results of evaluating the penetration stability of the secondary batteries of Examples 27 to 30 are shown in Table 7 below.

(2) Comparative Examples 11 to 15

The state of charge of the secondary battery of Comparative Example 8 gradually reduced by 10% to prepare secondary batteries of Comparative Examples 12 to 15.

The results of evaluating the penetration stability of the secondary batteries of Comparative Examples 12 to 15 are shown in Table 7 below.

TABLE 7

| | Weight ratio of Cathode 1 and multi-shaped NCM523 | SoC | Penetration Stability |
|---|---|---|---|
| Examples 10 | 80%:20% | SoC 100% | L3 |
| Examples 27 | 80%:20% | SoC 90% | L3 |
| Examples 28 | 80%:20% | SoC 80% | L3 |
| Examples 29 | 80%:20% | SoC 70% | L3 |
| Examples 30 | 80%:20% | SoC 60% | L3 |
| Comparative Example 8 | 80%:20% | SoC 100% | L5 |
| Comparative Example 12 | 80%:20% | SoC 90% | L5 |
| Comparative Example 13 | 80%:20% | SoC 80% | L5 |
| Comparative Example 14 | 80%:20% | SoC 70% | L4 |
| Comparative Example 15 | 80%:20% | SoC 60% | L4 |

As shown in Table 7, the penetration stability at high SOC was remarkably improved in Examples using the multi-shaped NCM523 as compared with Comparative Examples.

Experimental Example 6: Observation of the Surface and the Section of the Particle FIG. 2 to FIG. 6 were obtained by observing sections of the multi-shaped NCM111, the multi-shaped NCM523, the single-shaped NCM111 and the single-shaped NCM523 used in Examples and Comparative Examples with scanning electron microscopy (SEM).

Figure 2:
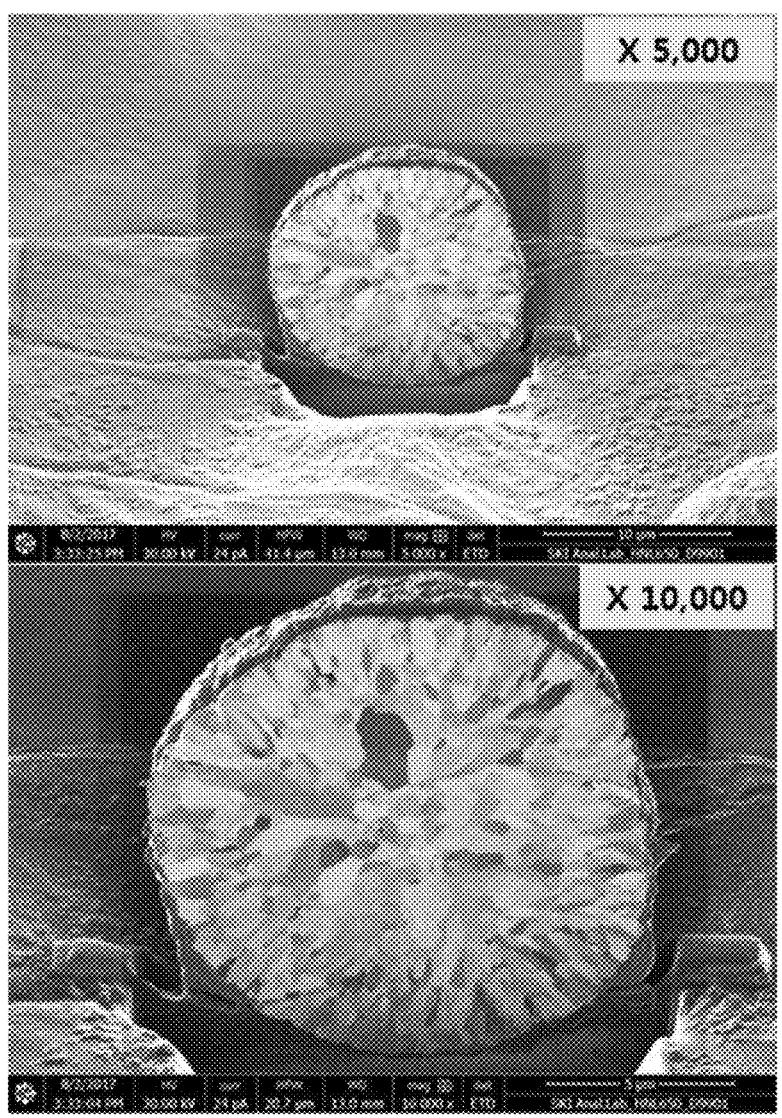
FIG. 2 to FIG. 6 are cross-sectional SEM (Scanning Electron Microscopy) images of second cathode active material particles used in some examples and comparative examples.

As shown in FIG. 2, the multi-shaped NCM111 used in some embodiments has particles with different shapes between the central region and the peripheral region. For example, the central region occupied about 60% of the particle radius, and the particle shape in the central region was observed as granular. The peripheral region occupied space excluding the central region, and the particle shape in the peripheral region was observed as needle shape (acicular).

Figure 3:
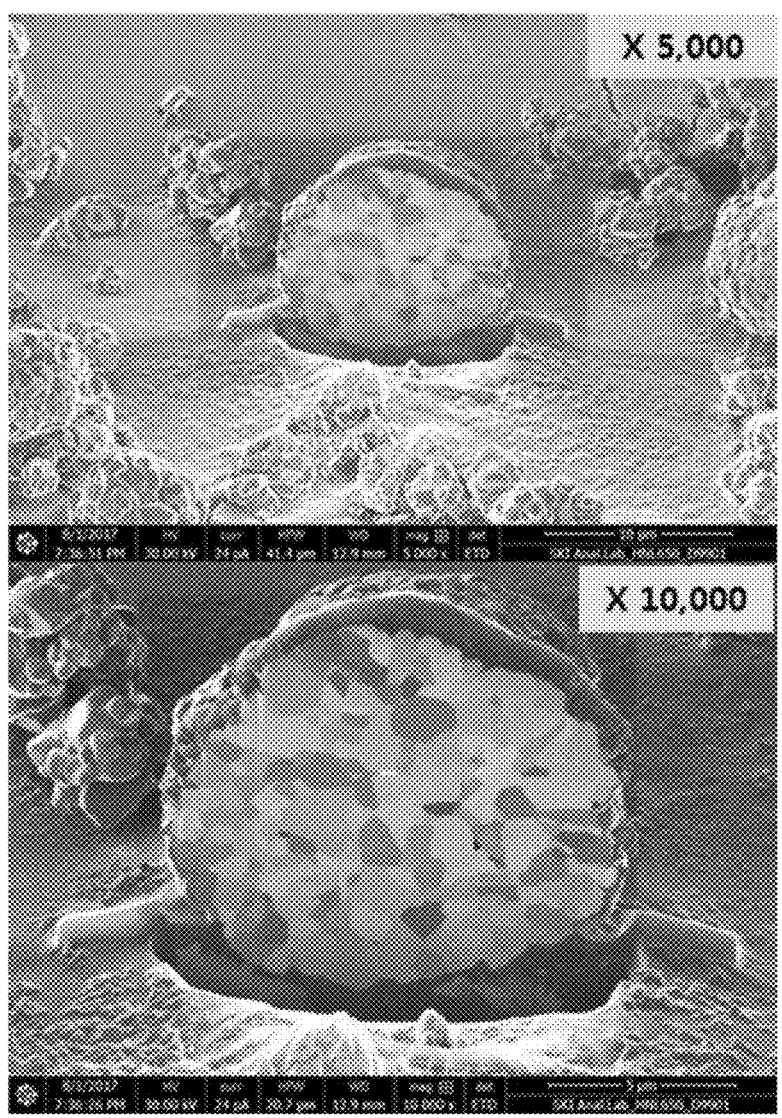
Figure 4:
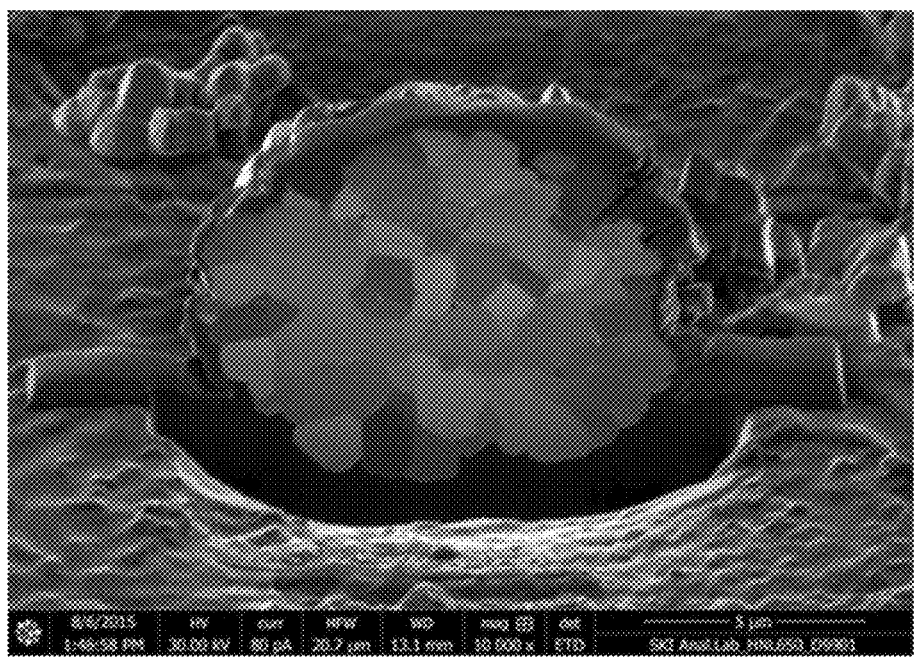

As shown in FIG. 3 and FIG. 4, the conventional NCM111 of the single-shaped structure has the substantially same particle shape between the central region and the peripheral region.

Figure 5:
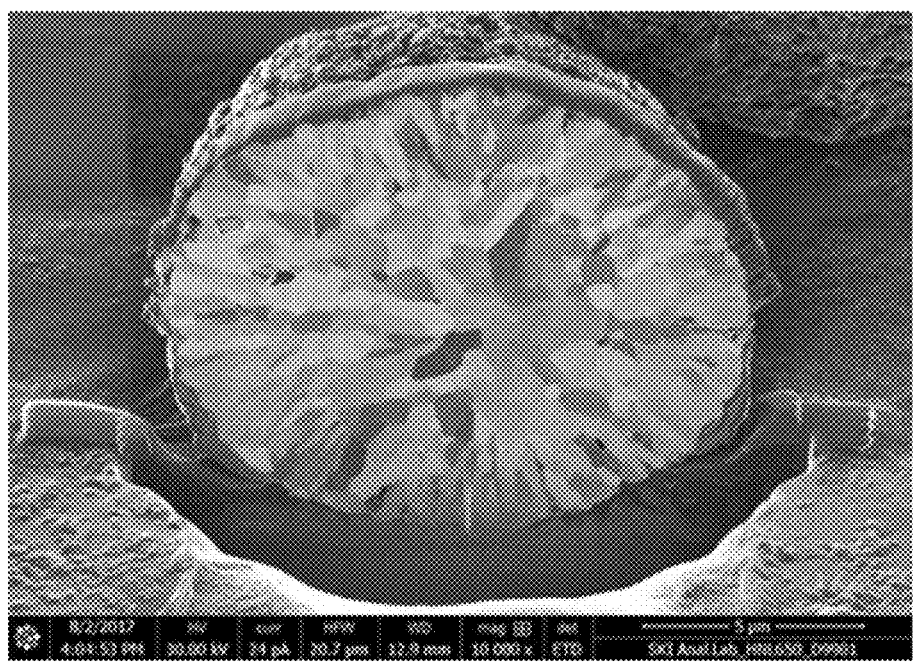

As shown in FIG. 5, the multi-shaped NCM523 used in some embodiments has particles with different shapes between the central region and the peripheral region. For example, the central region occupied about 45% of the particle radius, and the particle shape in the central region was observed as granular. The peripheral region occupied space excluding the central region, and the particle shape in the peripheral region was observed as rod shape.

Figure 6:
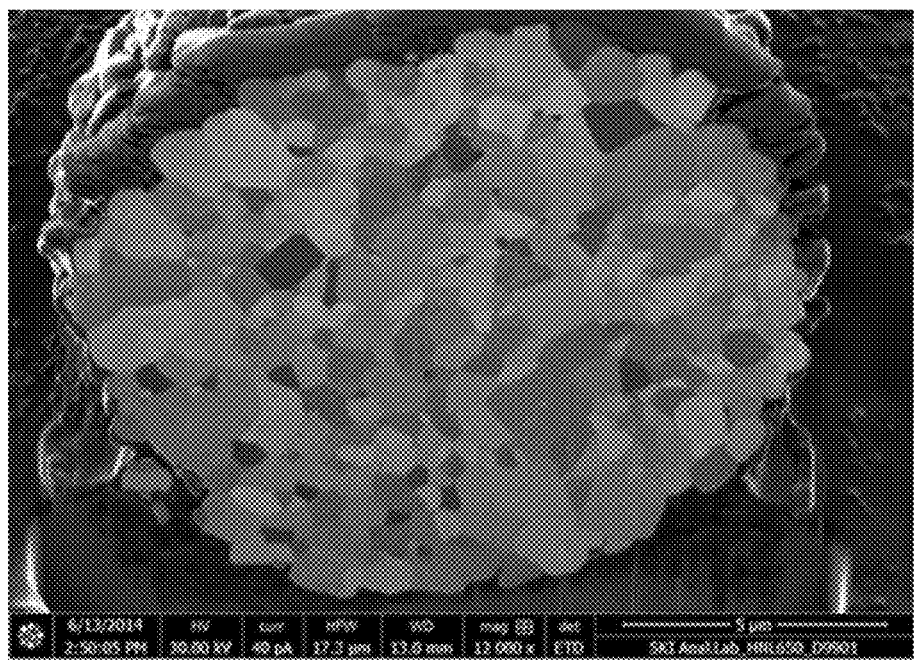

As shown in FIG. 6, the conventional NCM523 of the single-shaped structure has the substantially same particle shape between the central region and the peripheral region.

Experimental Example 7: Differential Scanning Calorimetry Measurement

Thermal properties of the multi-shaped NCM111 ('C1'), the single-shaped NCM111 ('C2'), the multi-shaped NCM523 ('C3'), and the single-shaped NCM523 ('C4') used in Examples and Comparative Examples were measured with differential scanning calorimetry. The results are shown in FIG. 7 and FIG. 8.

Figure 7:
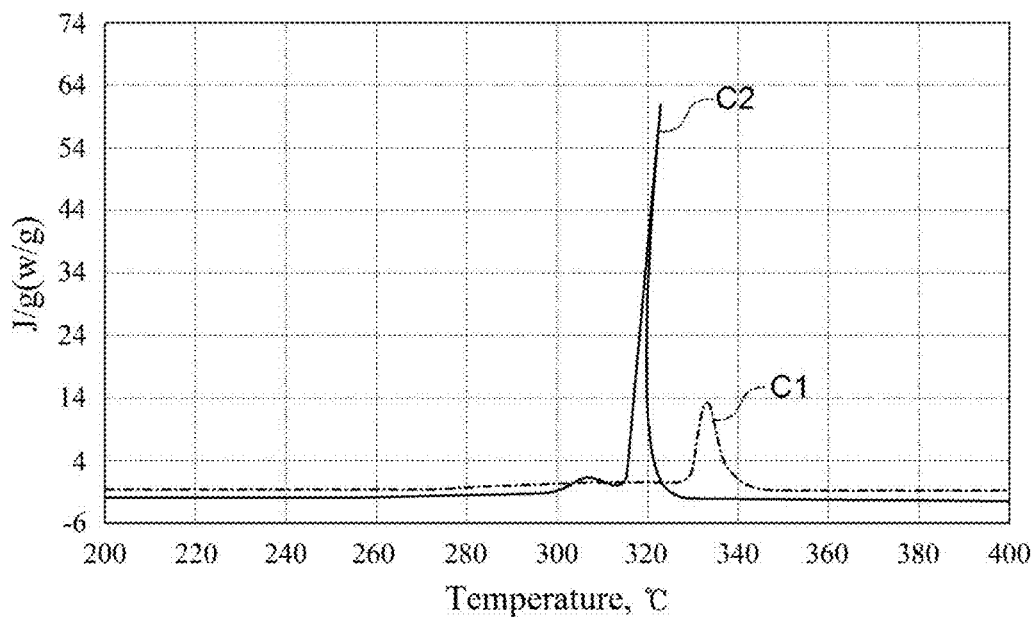
FIG. 7 is a graph of DSC (Differential Scanning Calorimetry) for the second cathode active material particles shown in FIG. 2 and FIG. 3.

As shown in FIG. 7, the thermal properties of the multi-shaped NCM111 (C1) used in some exemplary embodiments were improved as compared with the single-shaped NCM111 (C2).

Specifically, a narrow peak of 61 J/g of C2 was observed around temperature of 320° C., whereas a broad peak of about 13 J/g of C1 was observed around temperature of about 335° C. Thus, safety and reliability at high temperature of the secondary battery can be achieved by using the multi-shaped NCM111.

Figure 8:
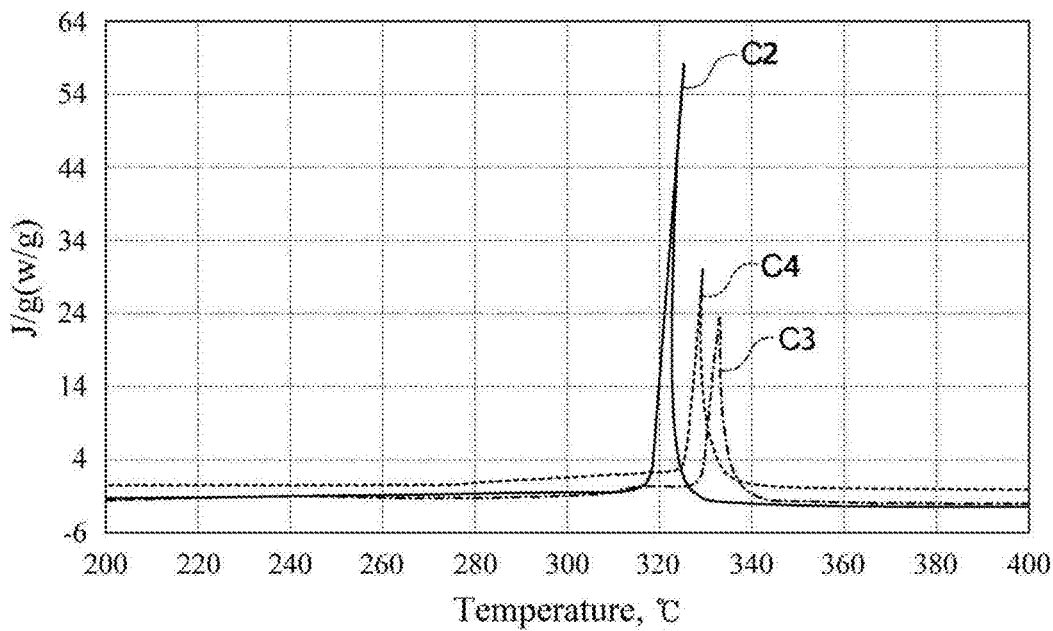
FIG. 8 is a graph of DSC for the second cathode active material particles shown in FIG. 4 to FIG. 6.

As shown in FIG. 8, the thermal properties of the multi-shaped NCM523 (C3) used in some exemplary embodiments were improved as compared with the single-shaped NCM111 (C2) and the single-shaped NCM523 (C4).

Specifically, a peak of 61 J/g of C2 was observed around temperature of 323° C., a peak of 30 J/g of C4 was observed around temperature of 329° C., whereas a broad peak of about 23 J/g of C3 was observed around temperature of about 334° C. Thus, safety and reliability at high temperature of the secondary battery can be achieved by using the multi-shaped NCM523.

What is claimed is:

1. A cathode active material for a lithium secondary battery, comprising:
a first cathode active material particle represented by the following Chemical Formula 1;

$$Li_xM1_aM2_bM3_cO_y,$$ [Chemical Formula 1]

wherein in Chemical Formula 1, M1, M2 and M3 independently include at least one element selected from a group consisting of Ni, Co, Mn, Na, Mg, Ca, Ti, V, Cr, Cu, Zn, Ge, Sr, Ag, Ba, Zr, Nb, Mo, Al, Ga and B,
$0<x\leq1.1$, $1.98\leq y\leq2.02$, $0.6\leq a\leq0.95$ and $0.05\leq b+c\leq0.4$, and a second cathode active material particle represented by the following Chemical Formula 2 or Formula 3;

$$Li_xNi_aCo_bMn_cM4_dM5_eO_y,$$ [Chemical Formula 2]

wherein in Chemical Formula 2, M4 includes at least one element selected from a group consisting of Ti, Zr, Al, Mg, and Cr; and M5 includes at least one element selected from a group consisting of Sr, Y, W, and Mo; and
$0<x<1.5$, $1.98\leq y\leq2.02$, $0.313\leq a\leq0.353$, $0.313\leq b\leq0.353$, $0.313\leq c\leq0.353$, $0\leq d\leq0.03$, $0\leq e\leq0.03$, and $0.98\leq a+b+c\leq1.02$, $$Li_xNi_\alpha Co_\beta Mn_\gamma M4_\delta M5\varepsilon O_y$$ [Chemical Formula 3]

wherein in Chemical Formula 3, M4 includes at least one element selected from a group consisting of Ti, Zr, Al, Mg, and Cr; and M5 includes at least one element selected from a group consisting of Sr, Y, W, and Mo; and
$0<x<1.1$, $1.98\leq y\leq2.02$, $0.48\leq\alpha\leq0.52$ $0.18<\beta\leq0.27$, $0.24\leq\gamma\leq0.32$, $0\leq\delta\leq0.03$, $0\leq\varepsilon\leq0.03$, and $0.98\leq\alpha+\beta+\gamma\leq1.02$, wherein metal elements except for lithium included in the second cathode active material particle do not have a concentration gradient region between a central portion of the second cathode active material particle and a surface of second cathode active material particle,
wherein the second cathode active material particle includes primary particles being aggregated with each other, the primary particles having different shapes or crystalline structures from each other,
wherein the different shapes include a first shape including a granular shape or a spherical shape and a second shape including a rod shape or a needle shape,
wherein the second cathode active material particle includes a first particle arranged in a central region and a second particle arranged in a peripheral region, and the first particle and the second particle have the different shapes or crystalline structures from each other.

2. The cathode active material for a lithium secondary battery according to claim 1,
wherein the first particle has the granular shape or the spherical shape, and the second particle has the rod shape or the needle shape.

3. The cathode active material for a lithium secondary battery according to claim 1, wherein the central region of the second cathode active material particle includes an area within a region corresponding to 20% to 80% of a radius from a center of the second cathode active material particle.

4. The cathode active material for a lithium secondary battery according to claim 1, wherein the first cathode active material particle includes a core portion, a shell portion, and a concentration gradient region between the core portion and the shell portion.

5. The cathode active material for a lithium secondary battery according to claim 4, wherein the core portion and the shell portion each includes a fixed composition.

6. The cathode active material for a lithium secondary battery according to claim 1, wherein the first cathode active material particle includes a continuous concentration gradient region formed from a center of the first cathode active material particle to a surface of the first cathode active material particle.

7. The cathode active material for a lithium secondary battery according to claim 1, wherein $0.7 \leq a \leq 0.9$ and $0.1 \leq b+c \leq 0.3$ in the Chemical Formula 1.

8. The cathode active material for a lithium secondary battery according to claim 1,
wherein M1 is nickel (Ni), M2 is manganese (Mn), and M3 is cobalt (Co).

9. The cathode active material for a lithium secondary battery according to claim 1, wherein $0.49 \leq \alpha \leq 0.51$ $0.18 \leq \beta \leq 0.22$, and $0.28 \leq \gamma \leq 0.32$ in the Chemical Formula 3.

10. The cathode active material for a lithium secondary battery according to claim 1, wherein a blending weight ratio of the first cathode active material particle and the second cathode active material particle is in a range from 9:1 to 1:9.

11. The cathode active material for a lithium secondary battery according to claim 1, wherein an exothermic peak of the second cathode active material particle is 40 J/g or less at 200° C. or more in a Differential Scanning Calorimetry (DSC) measurement.

12. The cathode active material for a lithium secondary battery according to claim 1, wherein the first cathode active material particle or the second cathode active material particle further includes a coating on a surface thereof, and the coating includes at least one selected from a group consisting of Al, Ti, Ba, Zr, Si, B, Mg, P, an alloy thereof and an oxide thereof.

13. The cathode active material for a lithium secondary battery according to claim 1, wherein the first cathode active material particle or the second cathode active material particle further includes a dopant including at least one selected from a group consisting of Al, Ti, Ba, Zr, Si, B, Mg, P, an alloy thereof and an oxide thereof.

* * * * *